United States Patent
Yang (10) Patent No.: US 7,098,563 B2
(45) Date of Patent: Aug. 29, 2006

(54) DRIVE SYSTEM HAVING A HOLLOW MOTOR MAIN SHAFT AND A COAXIAL, MANUALLY DRIVEN AUXILIARY SHAFT

(76) Inventor: Tai-Her Yang, No. 59, Chung Hsing 8 St., Si-Hu Town, Dzan-Hwa (TW)

( * ) Notice: Subject to any disclaimer, the term of this patent is extended or adjusted under 35 U.S.C. 154(b) by 179 days.

(21) Appl. No.: 10/703,569

(22) Filed: Nov. 10, 2003

(65) Prior Publication Data
US 2005/0099073 A1    May 12, 2005

(51) Int. Cl.
*H02K 7/116* (2006.01)
*H02K 16/00* (2006.01)
*H02K 7/108* (2006.01)

(52) U.S. Cl. .................. 310/83; 310/114; 310/75 D (58) Field of Classification Search ............... 310/83, 310/92, 266, 112, 114, 75 D, 78; 180/65.1, 180/65.6, 65.7, 220; 477/3, 7
See application file for complete search history.

(56) References Cited

U.S. PATENT DOCUMENTS

| | | | | |
|---|---|---|---|---|
| 1,870,076 A | * | 8/1932 | Thomson | 318/13 |
| 2,864,016 A | * | 12/1958 | Waltscheff | 310/102 R |
| 3,973,137 A | * | 8/1976 | Drobina | 310/114 |
| 5,708,314 A | * | 1/1998 | Law | 310/114 |
| 5,909,075 A | * | 6/1999 | Heimark | 310/103 |
| 6,211,597 B1 | * | 4/2001 | Nakano | 310/266 |
| 6,815,857 B1 | * | 11/2004 | Akatsu | 310/114 |
| 2005/0099073 A1 | * | 5/2005 | Yang | 310/75 R |

FOREIGN PATENT DOCUMENTS

JP      2002078288      *   2/2002

* cited by examiner

*Primary Examiner*—Karl Tamai
(74) *Attorney, Agent, or Firm*—Rabin & Berdo, P.C.

(57) ABSTRACT

A motor main shaft and auxiliary shaft coaxial drive system to provide dual transmission input or output at single end or both ends by having its main shaft made in hollow to receive insertion of an auxiliary shaft coaxially; with separate transmission to link to respective load; the auxiliary shaft may be driven by other dynamic source; a controllable clutch being provided between the main shaft and the auxiliary shaft of the motor; the auxiliary shaft being coupled to the main shaft of the motor either to be driven by the motor main shaft or to drive the motor main shaft; or the motor main shaft to be disengaged from the auxiliary shaft by manipulating the clutch.

2 Claims, 13 Drawing Sheets

FIG.15

DRIVE SYSTEM HAVING A HOLLOW MOTOR MAIN SHAFT AND A COAXIAL, MANUALLY DRIVEN AUXILIARY SHAFT

BACKGROUND OF THE INVENTION (a) Field of the Invention

The present invention is related to a motor main shaft and auxiliary shaft coaxial drive system, and more particularly, to a compact coaxial dual drive system in a single motor by having axially inserted the auxiliary shaft into the main shaft of the motor and both shafts are respectively provided with transmission at different speed ratios for output or input.

(b) Description of the Prior Art

In a conventional dual shaft drive system, usually two motors are coaxially provided by having their independent main shaft coaxially connected in series and separately driven, or having a main shaft of a single motor provided separately from the revolving shaft driven by another dynamic drive. Taking the passive bike generally available in the market that is subject to the manual drive or motor drive or simultaneous drive by both for example, both of an auxiliary shaft of the manual drive and a main shaft of a motor are usually separately located in the absence of an coaxial structure. Therefore it has the flaws of consuming more space and being a more complicated structure; and the same flaws are observed with other applications operating on dynamic and manual mixed drive, e.g., moped, light weight wheeled vehicle or any other carrier or mechanical load.

SUMMARY OF THE INVENTION

The primary purpose of the present invention is to provide a motor main shaft and auxiliary shaft coaxial drive system. The system provides dual transmission input or output at single end or both ends by having its main shaft made in hollow to receive insertion of an auxiliary shaft coaxially adapted with separate transmission to link to respective load. The auxiliary shaft may be driven by other dynamic source, and a controllable clutch being provided between the main shaft and the auxiliary shaft of the motor. The auxiliary shaft is coupled to the main shaft of the motor either to be driven by the motor main shaft or to drive the motor main shaft; or the motor main shaft is disengaged from the auxiliary shaft by manipulating the clutch.

DETAILED DESCRIPTION OF THE PREFERRED EMBODIMENTS

In a conventional dual shaft drive, such as that applied in a carrier of two or more than two wheels driven manually and by motor, the manually driven auxiliary shaft and the motor main shaft are usually separately provided at different places instead of being co-axially provided; they therefore consume comparatively a larger amount of space. The co-axially provided motor main shaft and the auxiliary shaft are specially designed to correct the defects of consuming too much space by inserting the auxiliary shaft into the motor main shaft, with each respectively being provided with a transmission, such as a dual chain gear structure to drive a load, so to save space and reduce the structural complexity. Meanwhile, the auxiliary shaft may be driven manually or by another dynamic source, or alternatively, a controllable clutch may be provided to manipulate the coupling of the auxiliary shaft to the motor main shaft for the transmission or to disengage from the motor main shaft.

Figure 1:
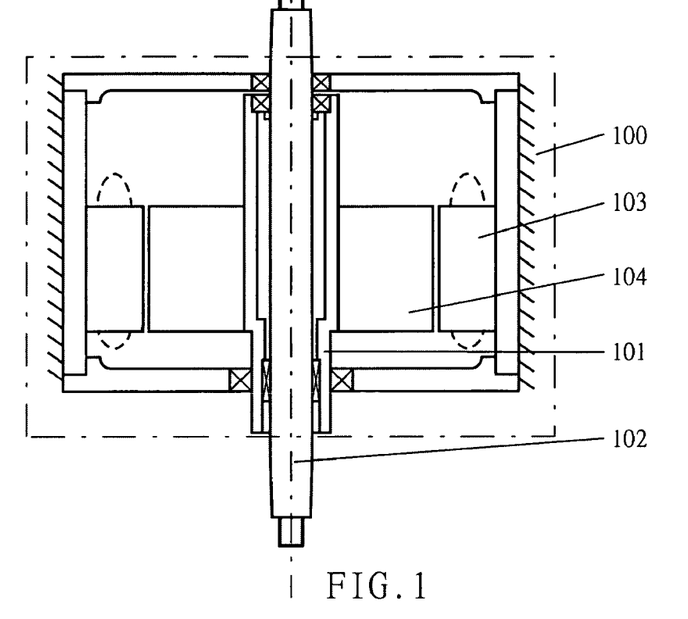
FIG. 1 is a schematic view showing a basic structure of a motor unit of the present invention with motor stator provided externally and motor rotor provided internally.
Figure 2:
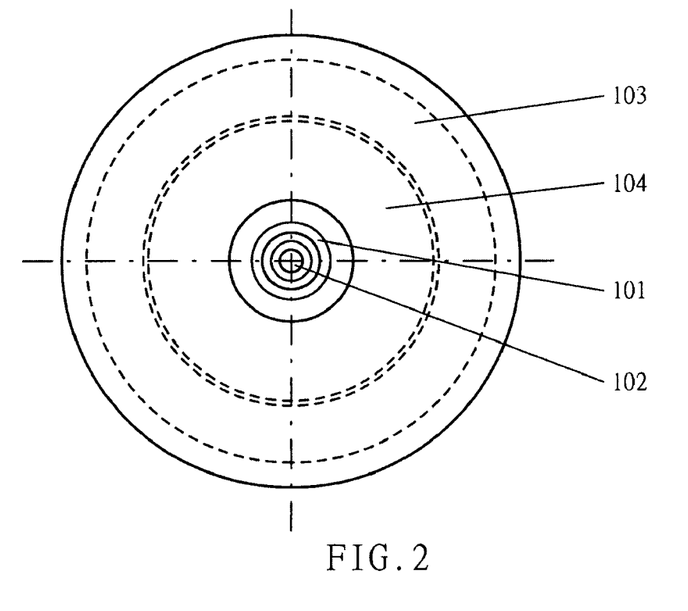
FIG. 2 is a side view of FIG. 1.

As illustrated in FIG. 1 for a schematic view of a basic structure of the present invention, wherein, a motor unit is comprised of a motor stator provide externally and a motor rotor provided internally. FIG. 2 is a side view of FIG. 1. The present invention is essentially comprised of a motor unit 100 provided with a hollow motor main shaft 101, and an auxiliary shaft 102 co-axially inserted into the hollow motor main shaft 101. The motor unit 100 is provided externally with a motor stator 103 and internally with a motor rotor 104. The motor rotor 104 freely revolves inside the motor stator 103 and is provided with the hollow motor main shaft 101 to coaxially receive the insertion of the auxiliary shaft 102, which in turn freely revolves inside the motor main shaft 101, and a proper bearing structure is each provided among revolving structures in the motor unit 100.

Figure 3:
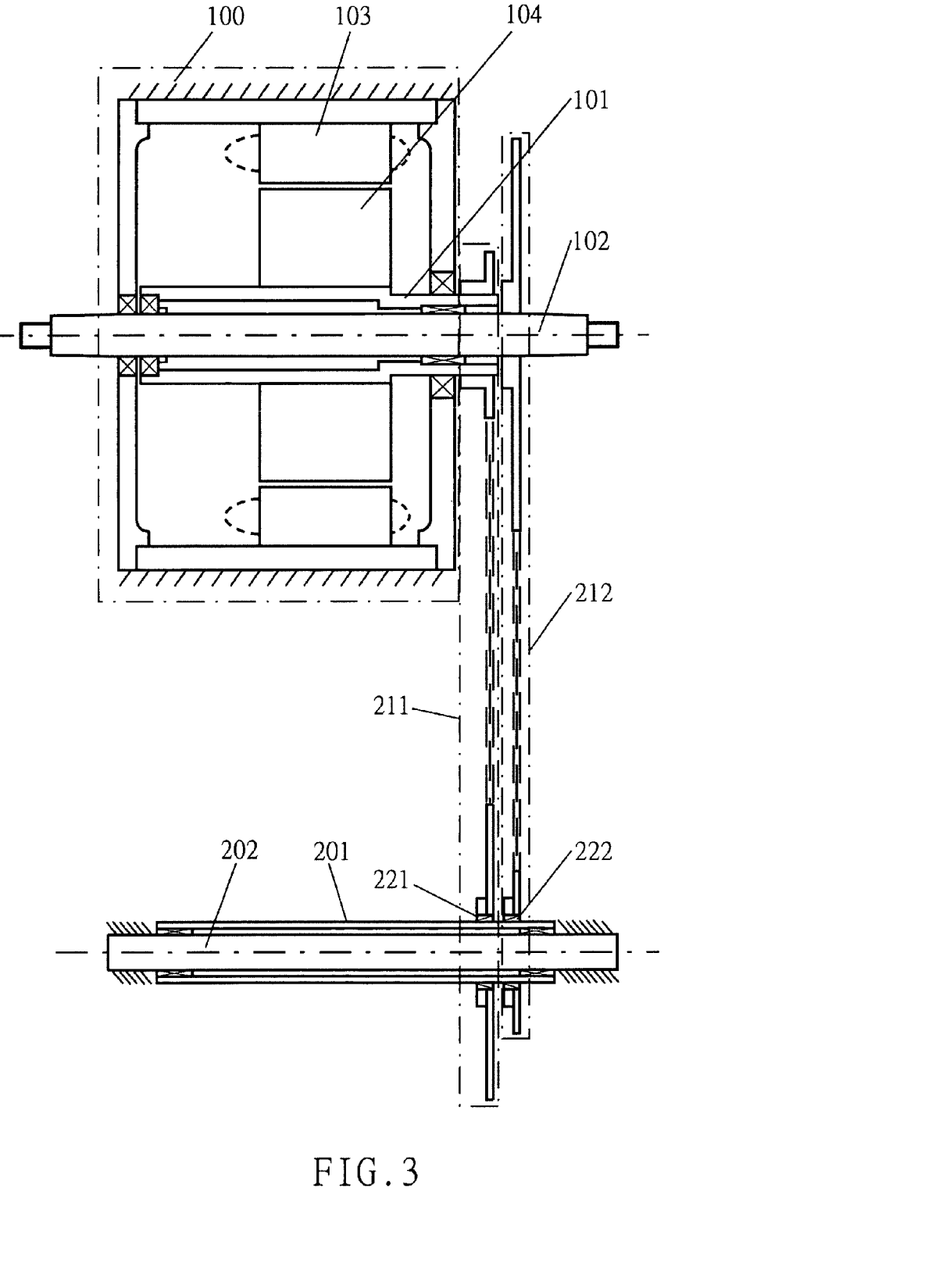
FIG. 3 is a schematic view of a structure of a preferred embodiment of the present invention to jointly drive a load by a motor main shaft and an auxiliary shaft coaxially inserted into the motor main shaft.
Figure 4:
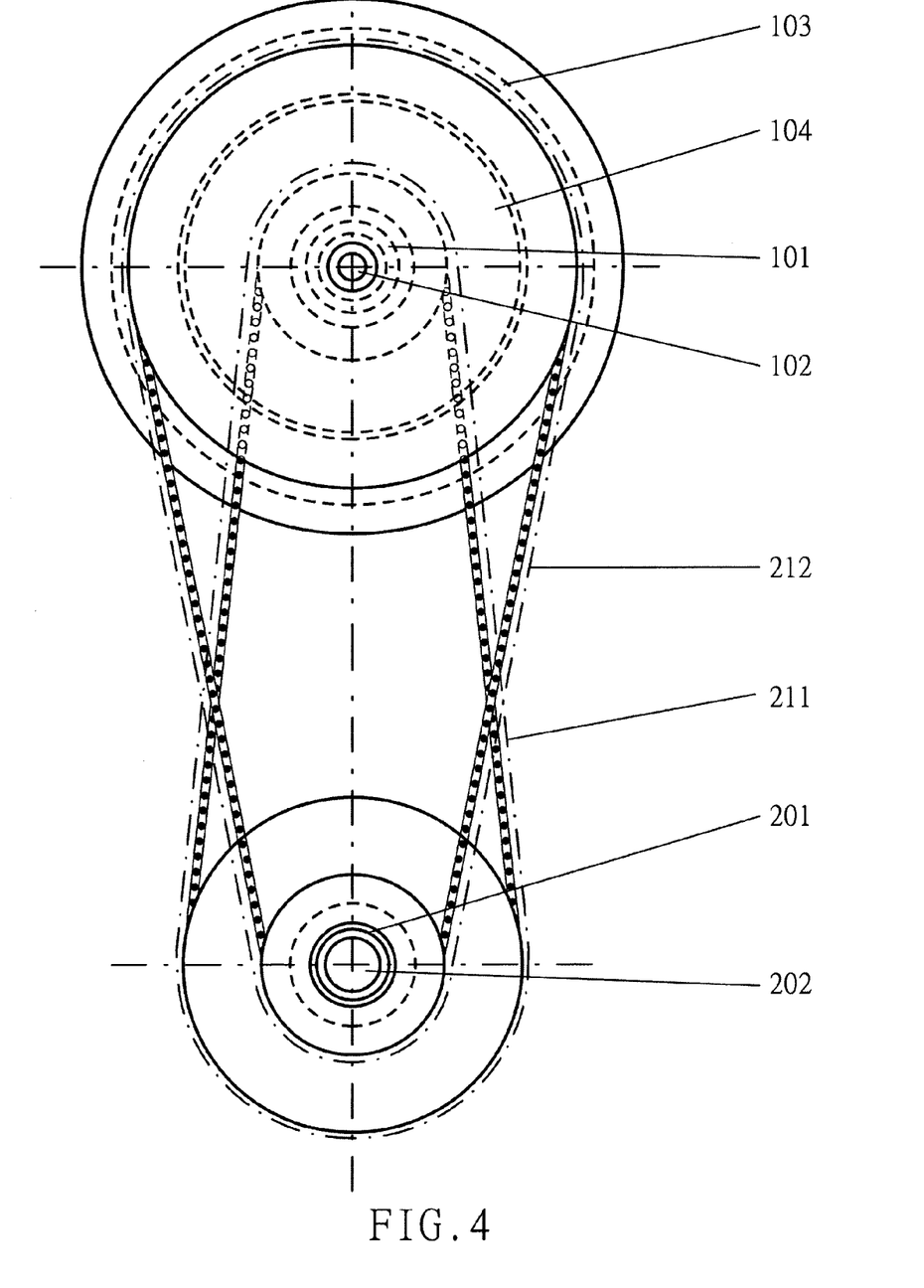
FIG. 4 is a side view of FIG. 3.

FIG. 3 is a schematic view of a structure of a preferred embodiment of the present invention to jointly drive a load by a motor main shaft and an auxiliary shaft coaxially inserted into the motor main shaft; and FIG. 4 is a side view of FIG. 3. Wherein, the hollow motor main shaft 101 and the auxiliary shaft 102 in the motor unit 100 illustrated in FIG. 1 is respectively adapted with a transmission at different speed ratios to drive a common load. That is, two transmission units at different speed ratios are respectively adapted to where between the load rotation part 201 and the motor main shaft 101, and the load rotation part 201 and the auxiliary shaft to jointly drive the load rotation part 201 that revolves in a bearing structure 202. Wherein, a first transmission 211 is provided for the motor main shaft 101 to drive the load rotation part 201 thus to form the first power train while the second transmission 212 is provided for the auxiliary shaft 102 to drive the load rotation part 201 thus to form a second power train. Meanwhile, two one-way transmission units 221, 222 are respectively provided between the load rotation part 201 and the first transmission 211 and the second transmission 212 depending on the transmission functional desired, so to transmit the revolving power from the motor main shaft 101 or the auxiliary shaft 102 to the load rotation part 201, which is prevented from engaging the inverse transmission to the motor main shaft 101 or the auxiliary shaft 102 on the prime mover side.

Furthermore, if two-way transmission is required between each transmission and the load rotation part 201, a linkage for direct transmission may be selected; or a one-way transmission is provided between the load rotation part 201 and the transmission 211 or 212 as applicable while the other transmission 211 or 212 is selected for direct transmission linkage.

Figure 5:
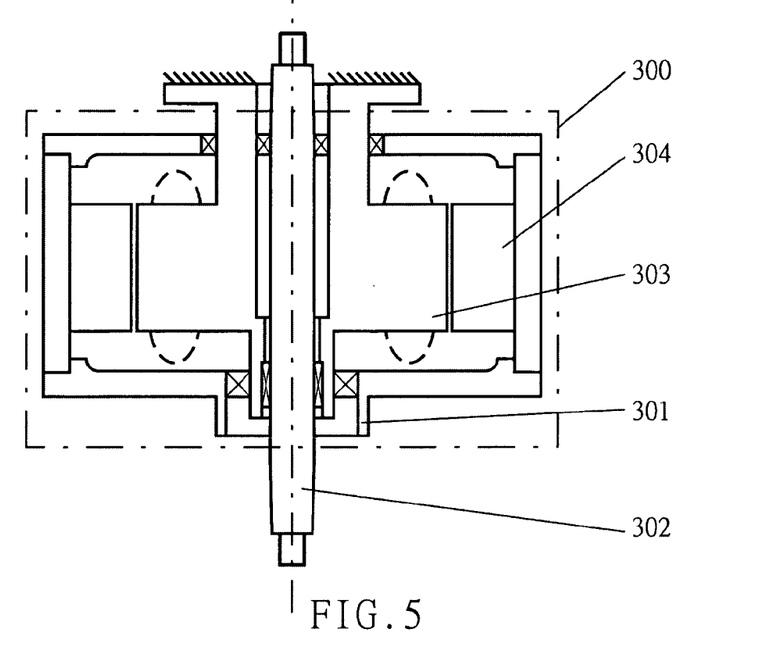
FIG. 5 is a schematic view showing a basic structure of a motor unit of the present invention with motor rotor provided externally and motor stator provided internally.
Figure 6:
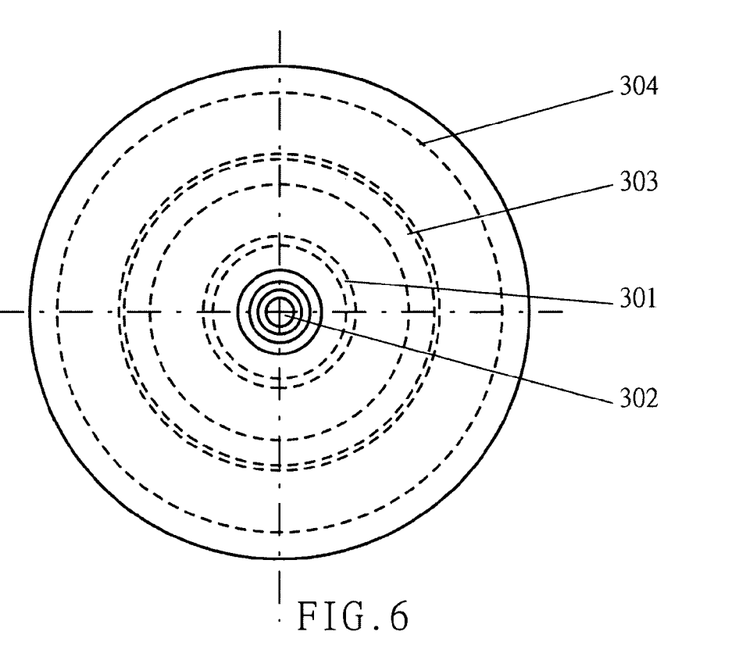
FIG. 6 is a side view of FIG. 5.

If structural requires, the coaxial drive system of the motor main shaft and the auxiliary shaft may be comprised of a motor unit having the motor rotor provided externally and the motor stator provided internally as illustrated in FIG. 5 for a schematic view showing a basic structure of a motor unit of the present invention with motor rotor provided externally and motor stator provided internally; and FIG. 6 for a side view of FIG. 5. Wherein, an internal motor stator 303 provided with a through hole of the motor unit 300 is unilaterally fixed with the through hole in the internal motor stator 303 to receive the insertion of an auxiliary shaft 302 while an external motor rotor 304 freely revolves around the internal motor stator 303 and the auxiliary shaft 302, and the motor main shaft 301 having a hollow structure is driven by the external motor rotor 304.

Figure 7:
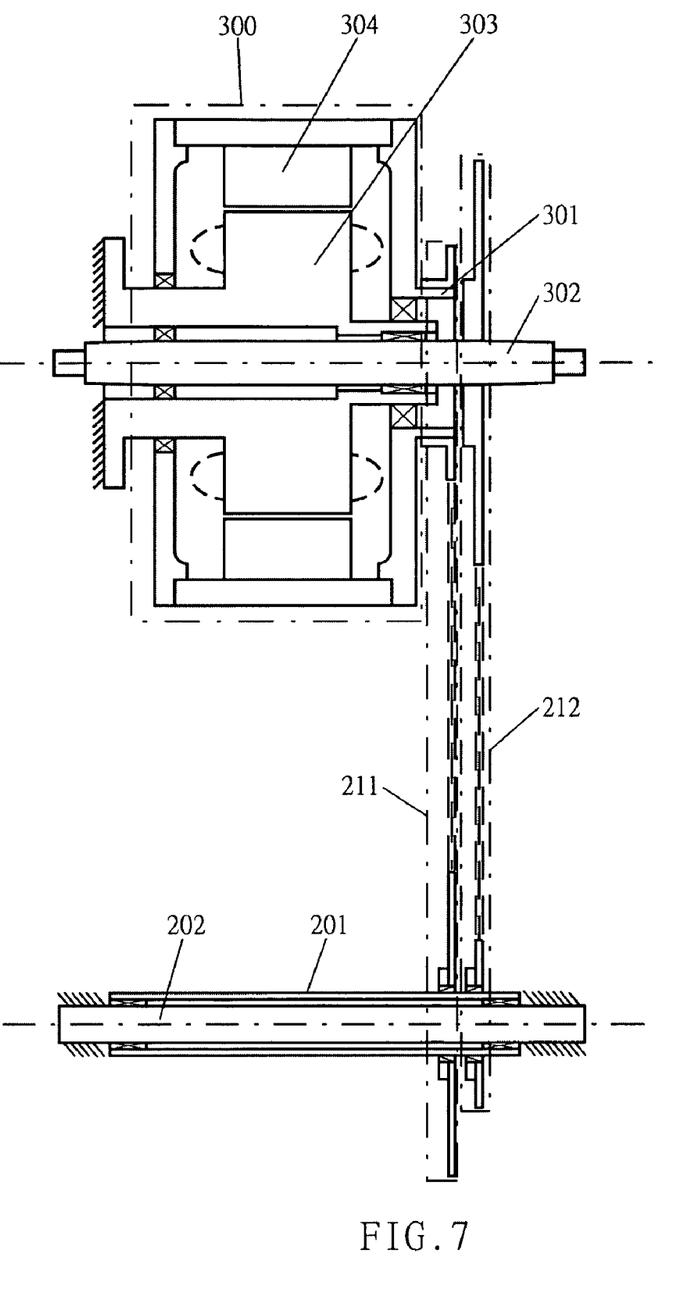
FIG. 7 is a schematic view of a structure of another preferred embodiment of the present invention to jointly drive a load by a motor main shaft and an auxiliary shaft coaxially inserted into the motor main shaft taken from FIG. 5.
Figure 8:
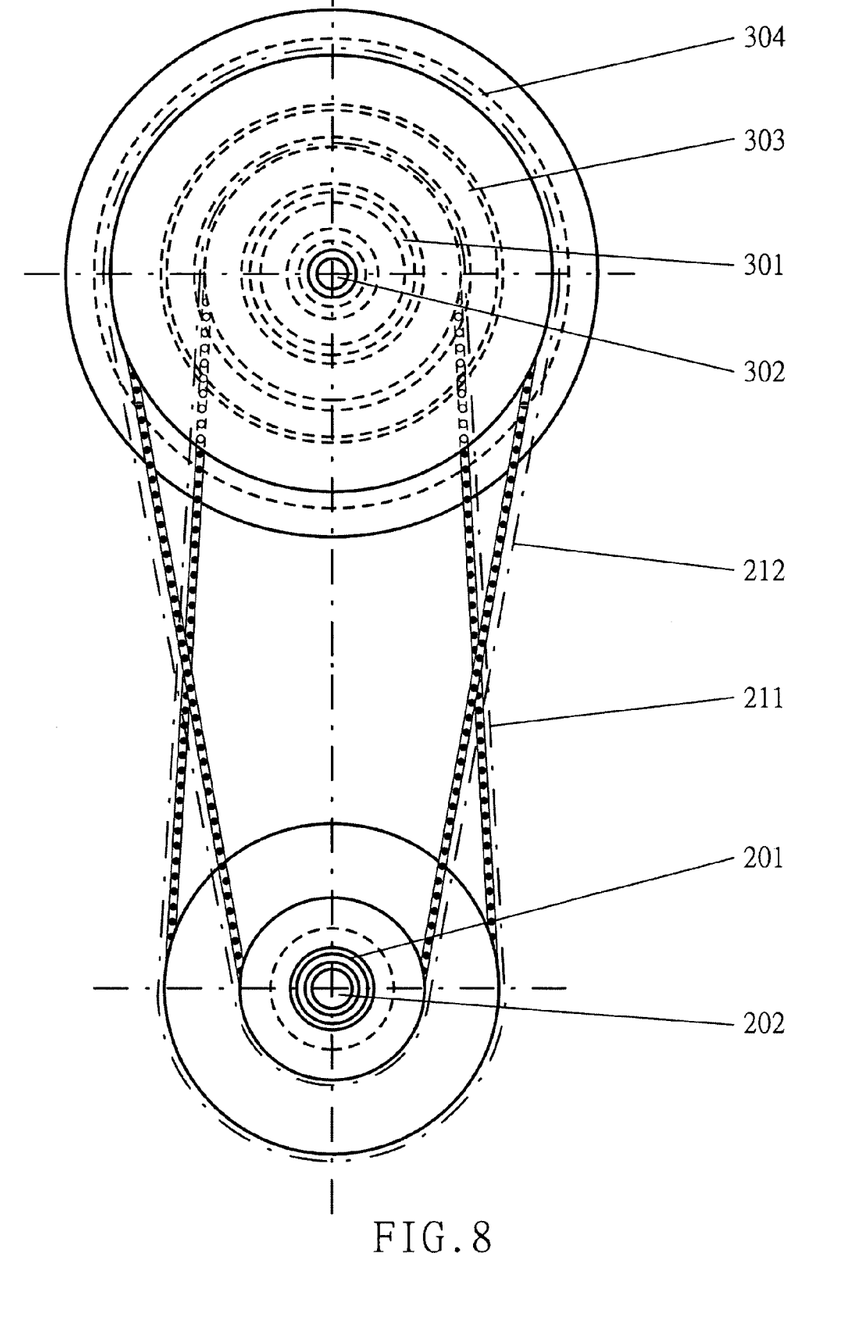
FIG. 8 is a side view of FIG. 7.

FIG. 7 is a schematic view of a structure of another preferred embodiment of the present invention to jointly drive a load by a motor main shaft and an auxiliary shaft coaxially inserted into the motor main shaft taken from FIG. 5, and FIG. 8 is a side view of FIG. 7. Wherein, the first transmission 211 is provided between the load rotation part 201 and the motor main shaft 301 having a hollow structure driven by the external motor rotor 304 of the motor unit 300; while the second transmission 212 is provided between the load rotation part 201 and the auxiliary shaft 302 coaxially penetrating the through hole of the internal motor stator 303.

Figure 9:
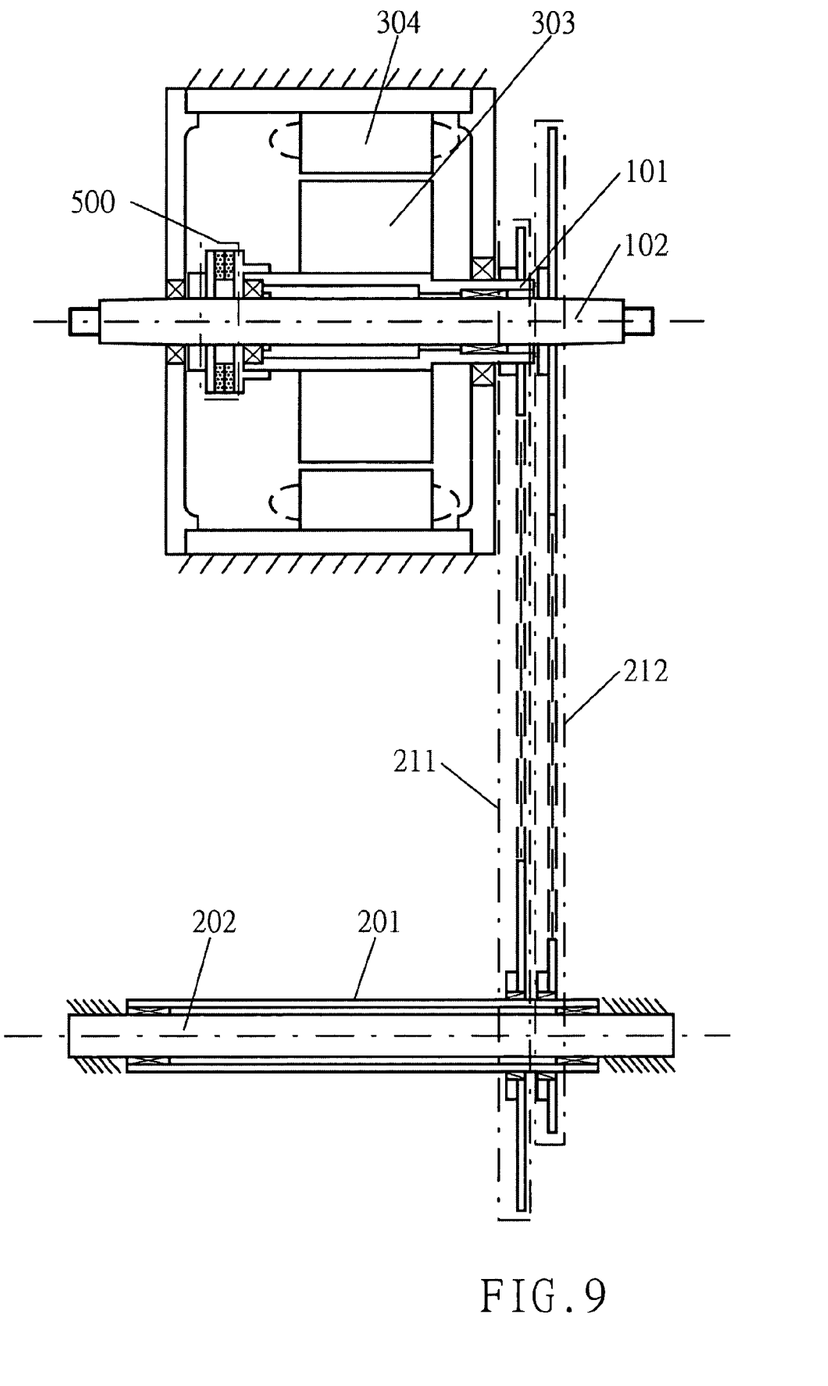
FIG. 9 is a schematic view showing another preferred embodiment yet of the present invention having provided a controllable clutch at where between the hollow motor main shaft and the auxiliary shaft coaxially inserted into the motor main shaft.
Figure 10:
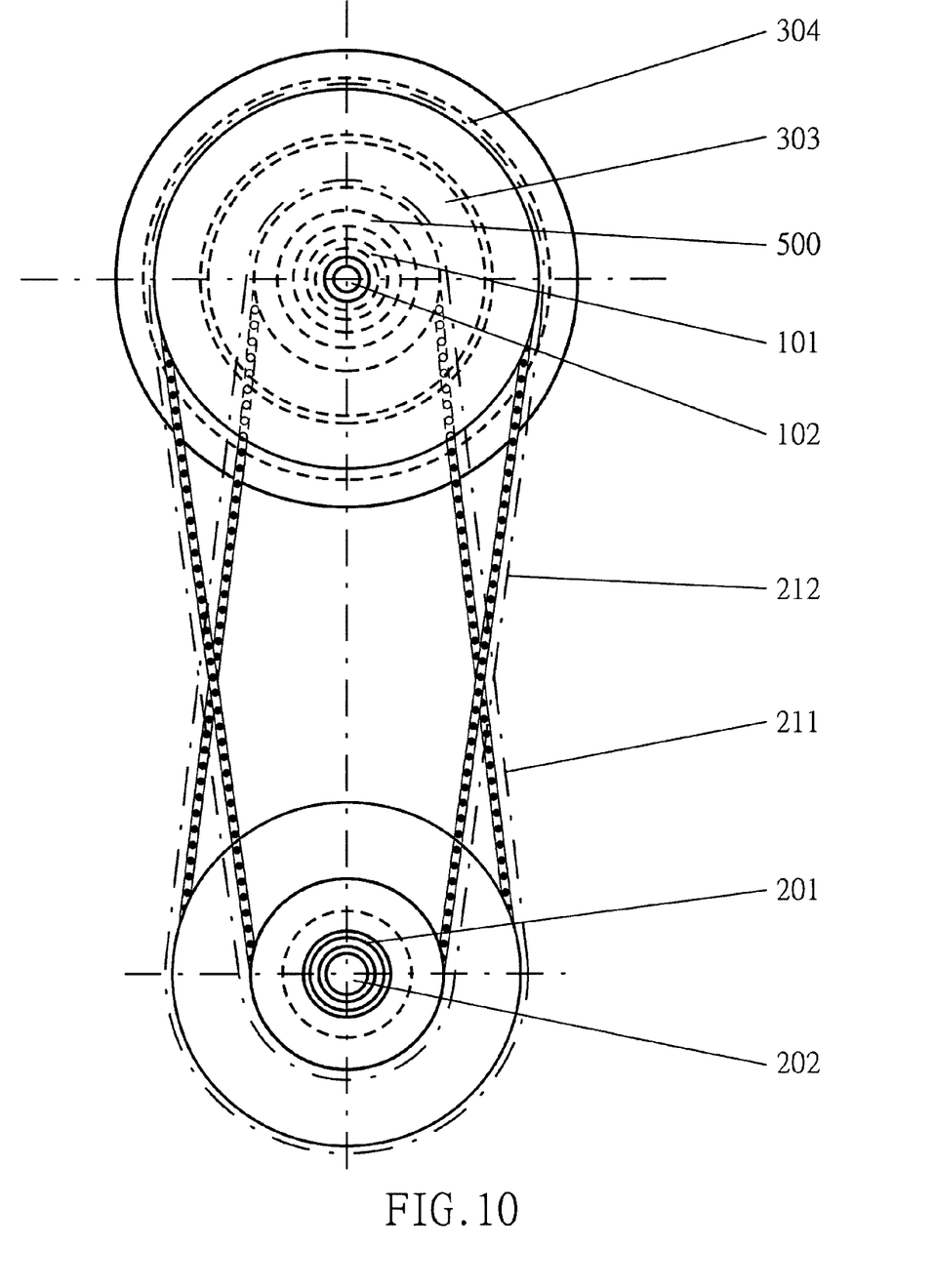
FIG. 10 is a side view of FIG. 9.

Furthermore, the coaxial drive system of the motor main shaft and the auxiliary shaft may be adapted with a controllable clutch at where between the motor main shaft and the auxiliary shaft as illustrated in FIG. 9 for a schematic view showing another preferred embodiment yet of the present invention having provided a controllable clutch at where between the hollow motor main shaft and the auxiliary shaft coaxially inserted into the motor main shaft, and in FIG. 10, a side view of FIG. 9. The preferred embodiment illustrated in FIGS. 9 and 10 takes the motor unit 100 provided with an external motor stator and an internal motor rotor as shown in FIG. 1 while a controllable clutch 500 is provided between the motor main shaft 101 and the auxiliary shaft 102. The first transmission 211 and the second transmission 212 operate at different speed ratios. To avoid interference of the operation by both transmission units 211, 212 at different speed ratios, a one-way transmission to prevent interference is each provided at where between the load rotation part 201 and the first transmission 211 provided in relation to the motor main shaft 101 serving as the prime mover side, and at where between the load rotation part 201 and the second transmission 212 provided in relation to the auxiliary shaft 102. Accordingly, when the controllable clutch 500 is disengaged, the revolving power from the motor unit 100 drives from the motor main shaft 101 the load rotation part 201 through the first transmission 211; or when the controllable clutch 500 is in closed status, the motor unit 100 simultaneously drives the motor main shaft 101 and the auxiliary shaft 102, and then drives the load rotation part 201 respectively through the separately adapted first transmission 211 and second transmission 212 operating at different speed ratios and the interference resulted from different speed ratios is eliminated by the one-way transmission provided at where between the first transmission 211 or the second transmission 212 adapted in relation to the motor main shaft 101 and the auxiliary shaft 102, and the load rotation part 201.

The structure of the controllable clutch 500 provided between the motor main shaft and the auxiliary shaft may be also applied in the motor unit 300 having an external motor rotor and an internal motor stator as illustrated in FIG. 5 with the structural principles for the controllable clutch 500, the first transmission 211, the second transmission 212 and the load rotation part 201 same as that of the preferred embodiment illustrated in FIGS. 9 and 10.

If an eccentric type of clutch is used for the controllable clutch 500 of the coaxial drive system of the aforesaid motor main shaft and the auxiliary shaft, an eccentric clutch that is closed in normal condition and is disengaged when the speed increases up to a preset value, or another eccentric clutch that is disengaged in normal condition and is closed when the speed increases up to a preset value depending on the function required. Meanwhile, the relation between the speed ratios of the first transmission 211 and the second transmission 212 and the layout of the one-way transmission may be relatively adapted according to the transmission mechanism.

Figure 11:
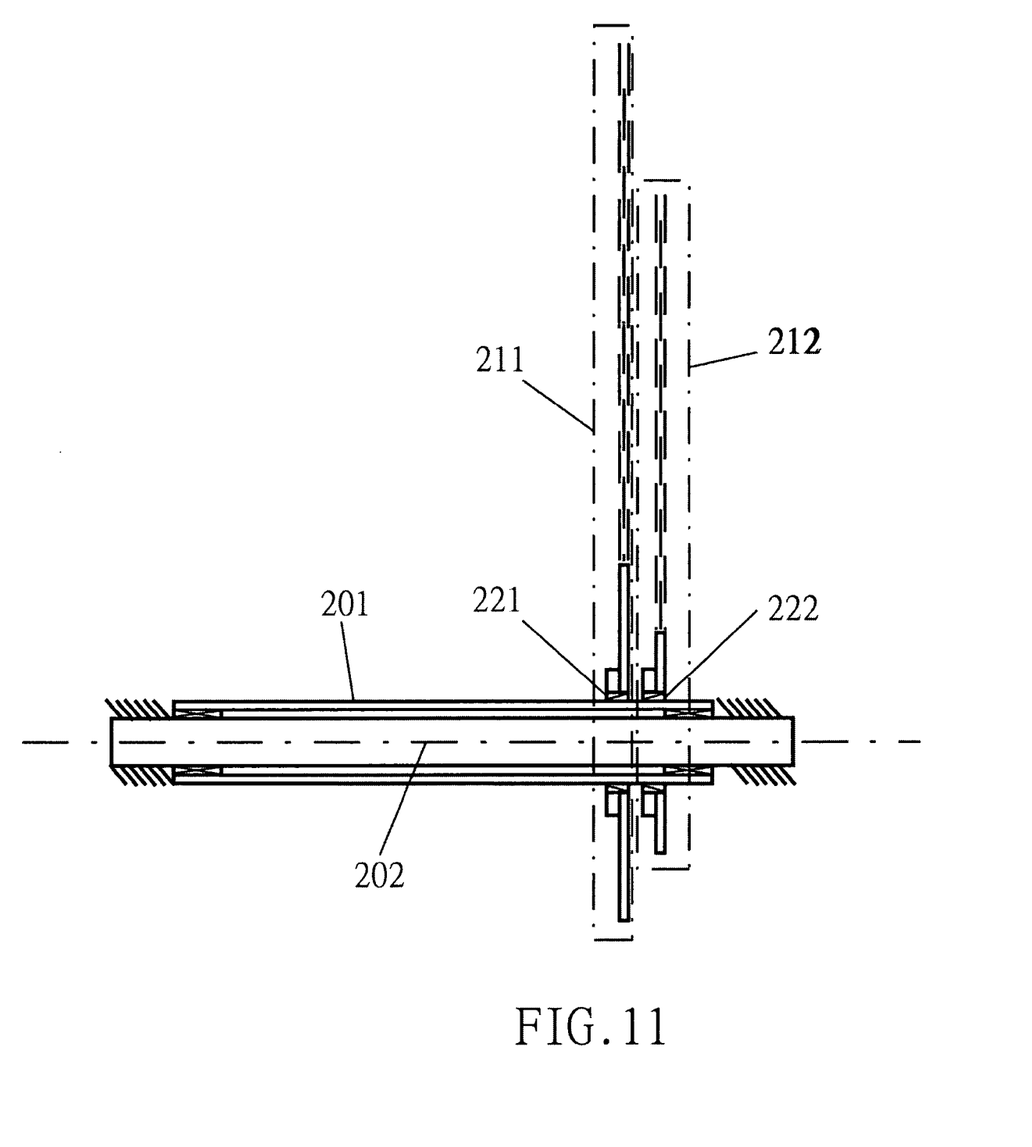
FIG. 11 is a schematic view showing another preferred embodiment yet of the present invention with two units of power trains respectively provided with a one-way transmission.

The additional one-way transmission in the power train to eliminate interference due to different ratios during the operation of the first power train and the second power train comprised of two transmission units 211 and 212 operating at different speed ratios and the load rotation part 201 in those preferred embodiments illustrated in FIGS. 1 through 10 may be provided in the following methods:

(1) As illustrated in FIG. 11 for a schematic view showing another preferred embodiment yet of the present invention with two units of power trains respectively provided with a one-way transmission, two one-way transmission units 221, 222 are respectively provided at an interference point in the related power transmission operation for two power trains to avoid interference, the first power train is formed between the input side of the first transmission 211 driving by the motor main shaft 101 or 301 and the output side of the first transmission 211, and the load rotation part 201; and the second power train is formed between the input side of the second transmission 212 driving by the auxiliary shaft 102 and the output side of the second transmission 212, and the load rotation part 201.

Figure 12:
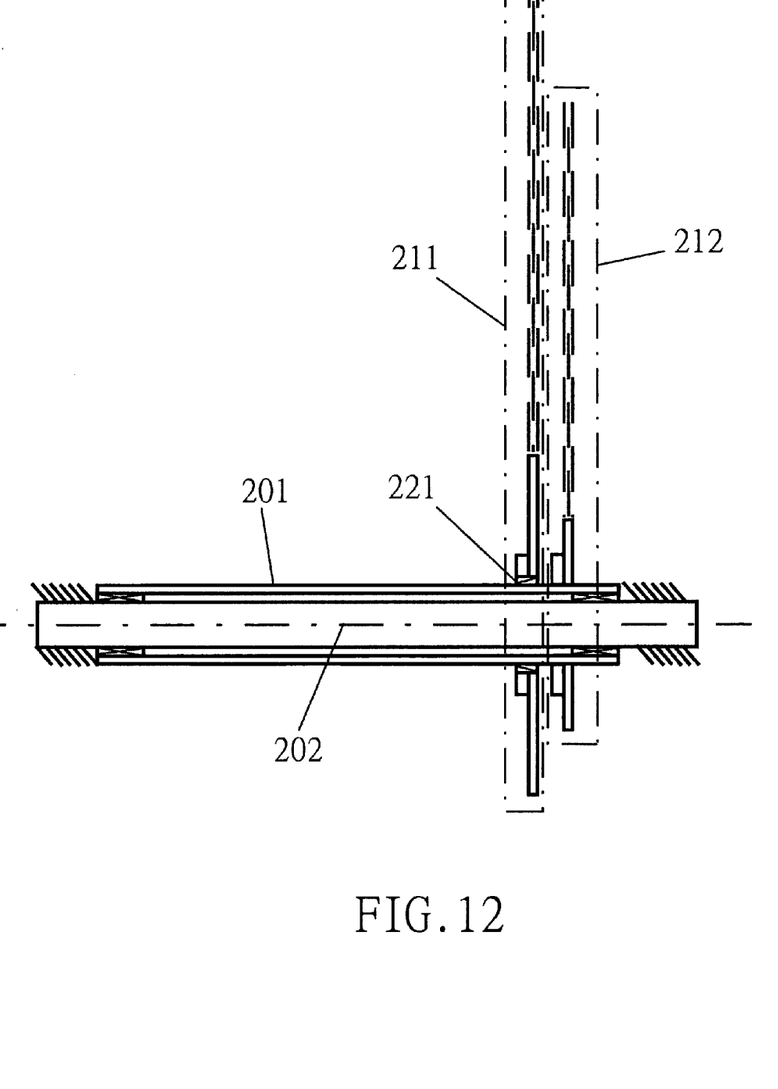
FIG. 12 is a schematic view showing another preferred embodiment yet of the present invention having its power chain driven by the main shaft of the motor of the present invention provided with a one-way transmission, and the power chain driven by the auxiliary to directly drive the rotation part of the load.

(2) As illustrated in FIG. 12 for a schematic view showing another preferred embodiment yet of the present invention having its power chain driven by the main shaft of the motor of the present invention provided with a one-way transmission, and the power chain driven by the auxiliary to directly drive the rotation part of the load, the first power train is formed between the first transmission 211 driven by the motor main shaft 101 or 301 and the load rotation part 201 and is provided with the first one-way transmission 221; while the second power train is formed by having the second transmission 212 driven by the auxiliary shaft 102 to directly drive the load rotation part 201.

Figure 13:
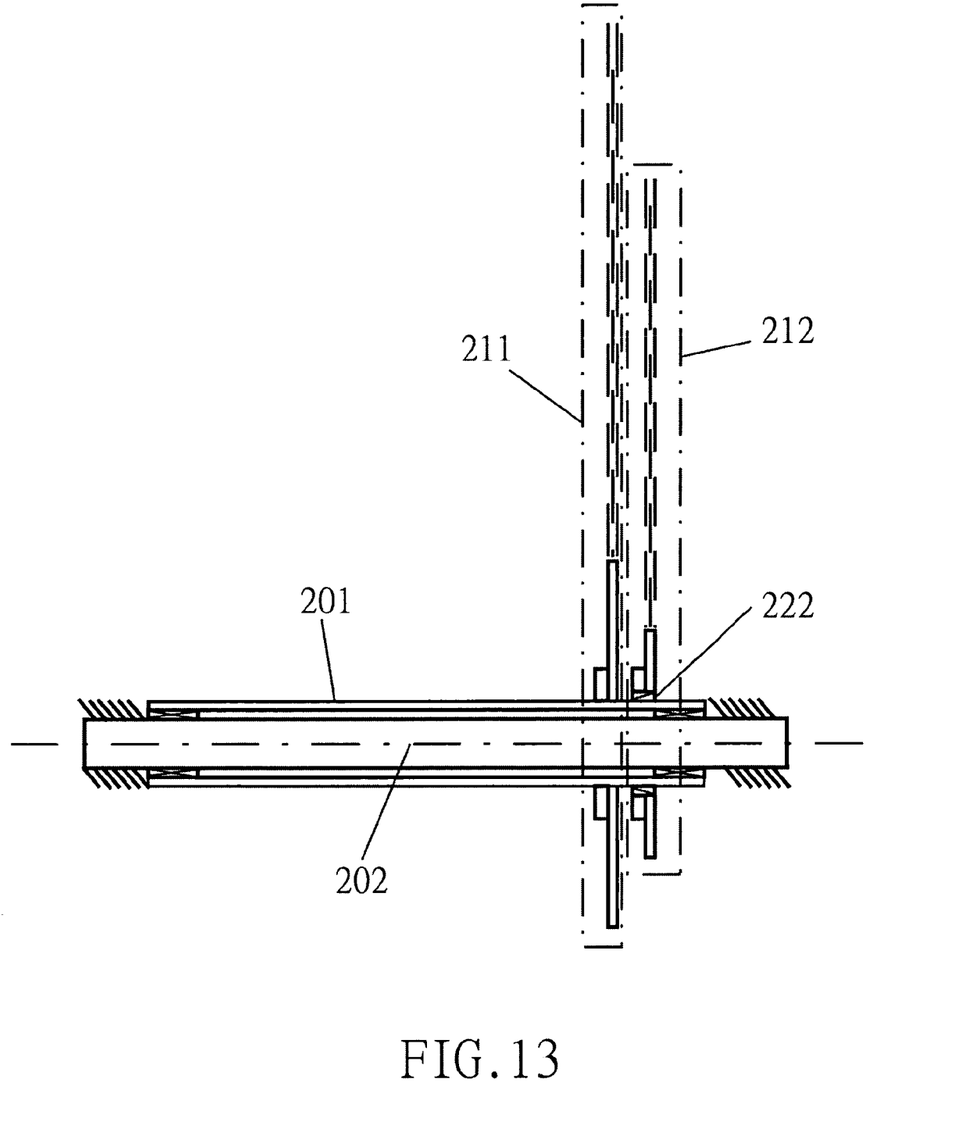
FIG. 13 is a schematic view showing another preferred embodiment yet of the present invention having a one-way transmission provided to the power train driven by the auxiliary shaft and the power chain driven by the motor main shaft to directly drive the rotation part of the load.

(3) As illustrated in FIG. 13 for a schematic view showing another preferred embodiment yet of the present invention having a one-way transmission provided to the power train driven by the auxiliary shaft and the power chain driven by the motor main shaft to directly drive the rotation part of the load, the second power train is formed between the second transmission 212 driven by the auxiliary shaft 102 or 302 and the load rotation part 201 provided with the second one-way transmission 222; while the first power train is formed by having the first transmission 211 driven by the motor main shaft 101 to directly drive the load rotation part 201.

Figure 14:
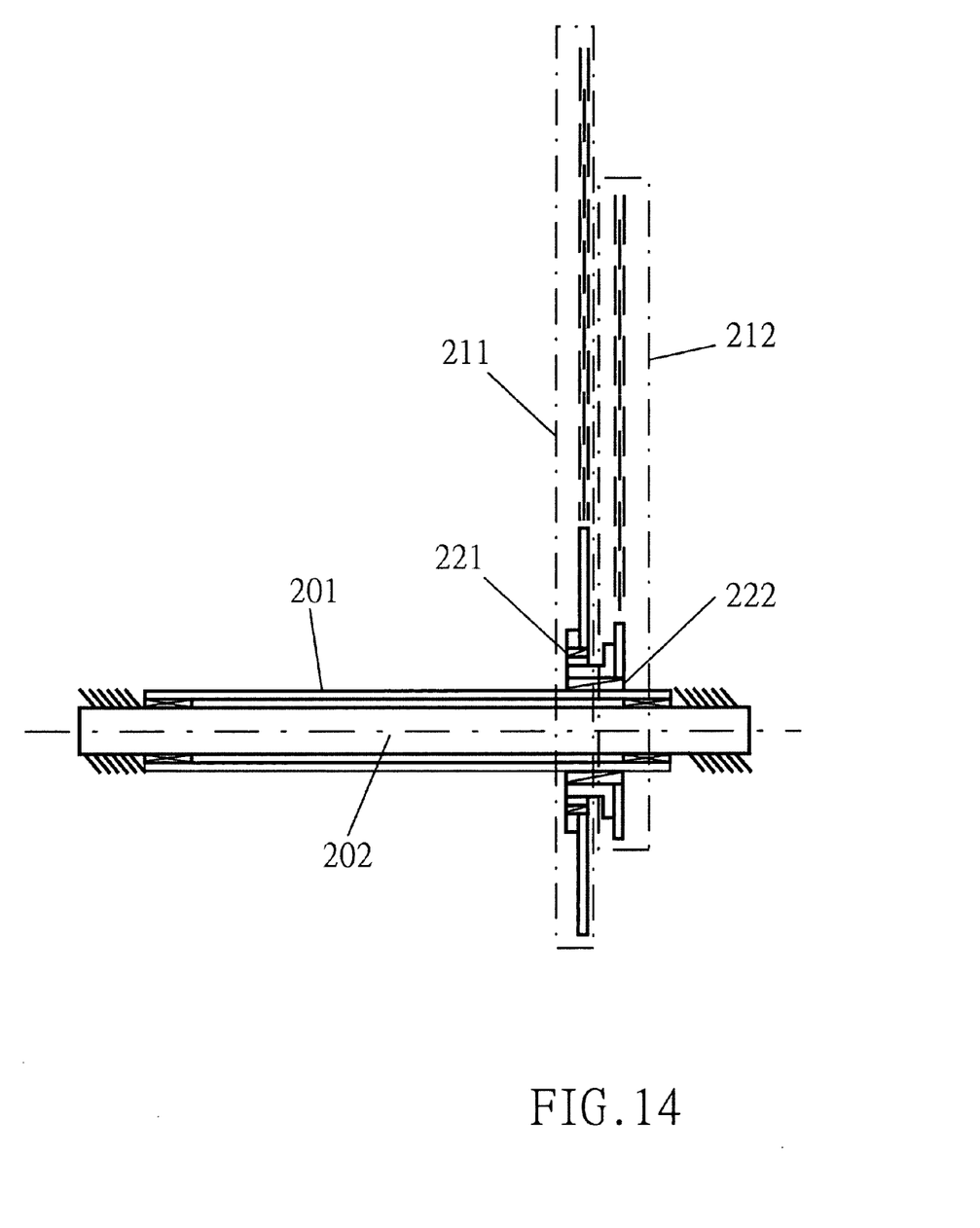
FIG. 14 is a schematic view showing another preferred embodiment yet of the present invention having a one-way transmission in sequence of a first power train, a second power train and a rotation part of a load.

(4) As illustrated in FIG. 14 for a schematic view showing another preferred embodiment yet of the present invention having a one-way transmission in sequence of a first power train, a second power train and a rotation part of a load, the output side of the second transmission 212 driven by the auxiliary shaft 102 is driven first through the first one-way transmission 221 by the output side of the first transmission 211 driven by the motor main shaft 101 or 301; and the load rotation part 201 is driven through the second one-way transmission 222 by the output side of the second transmission 212 driven by the auxiliary shaft 102 for the first power train to drive the second power train in one direction, in turn the second power train drives the load rotation part 201 in the same direction, resulting in a one-way transmission mechanism comprised of the first power train, the second power train and the load rotation part in sequence.

Figure 15:
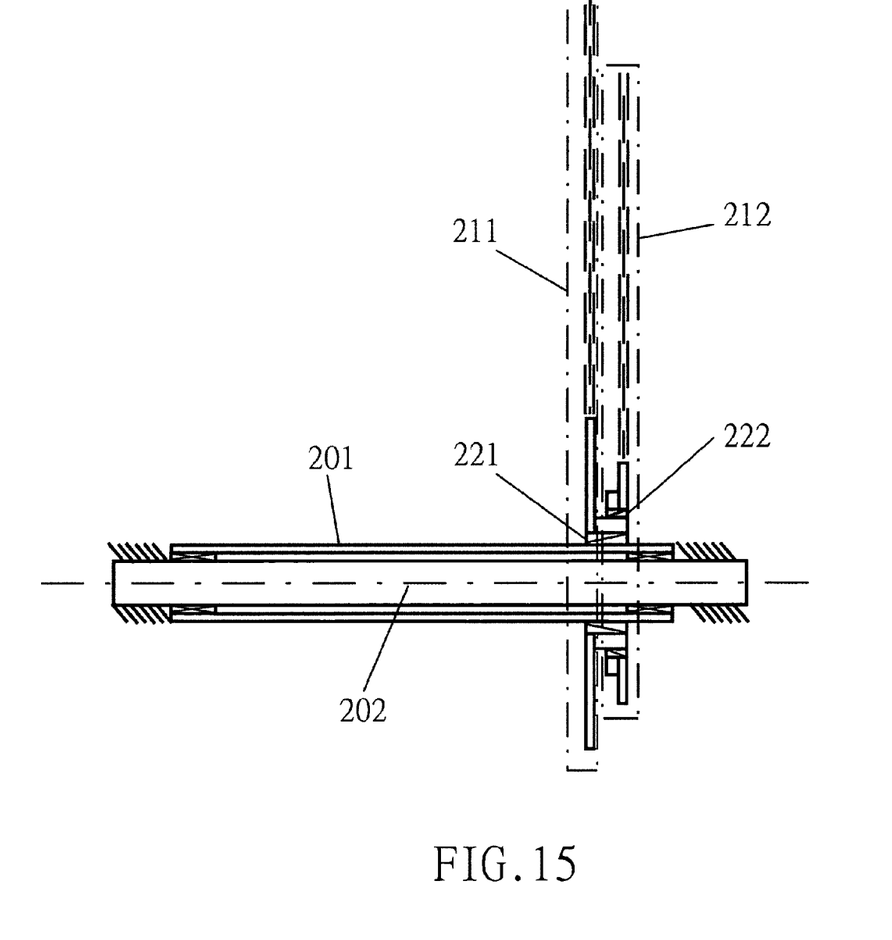
FIG. 15 is a schematic view showing another preferred embodiment yet of the present invention having a one-way transmission in sequence of the second power train, the first power train and the rotation part of the load.

(5) As illustrated in FIG. 15 for a schematic view showing another preferred embodiment yet of the present invention having a one-way transmission in sequence of the second power train, the first power train and the rotation part of the load, the output side of the first transmission 211 driven by the motor main shaft 101 is driven first through the second one-way transmission 222 by the output side of the second transmission 212 driven by the auxiliary shaft 102 or 302; and the load rotation part 201 is driven through the first one-way transmission 221 by the output side of the first transmission 211 driven by the motor main shaft 101 for the second power train to drive the first power train in one direction, in turn the first power train drives the load rotation part 201 in the same direction, resulting in a one-way transmission mechanism comprised of the second power train, the first power train and the load rotation part in sequence.

To sum up, the coaxial drive system comprised of the motor main shaft and the auxiliary shaft of the present invention by having the motor main shaft made in a hollow structure to receive co-axially the insertion of the auxiliary shaft in adaptation of the one-way transmission provided at the load rotation part is compact and reduce the complexity of a specific drive, and an optional clutch is provided between the motor main shaft and the coaxially inserted auxiliary shaft as required is innovative and providing specific function. Therefore, this application for patent is duly filed accordingly.

The invention claimed is:

1. A drive system, comprising:
a motor unit, including
 a hollow motor main shaft,
 an auxiliary shaft co-axially inserted within the hollow motor main shaft, the auxiliary shaft being adapted to be driven manually,
 a motor stator,
 a motor rotor disposed inside of the motor stator, the motor rotor being adapted to revolve freely within the motor stator and being connected to the hollow motor main shaft, the auxiliary shaft being adapted to revolve freely within the motor main shaft, and
 a plurality of bearings disposed to support respective ends of the motor main shaft and the auxiliary shaft;
a load rotation part revolvingly supported by a bearing;
first and second transmissions having different speed ratios and being respectively provided between the load rotation part and the motor main shaft, and the load rotation part and the auxiliary shaft, to jointly drive the load rotation part, the first transmission being connected to the motor main shaft to drive the load rotation part to thus form a first power train, while the second transmission being connected to the auxiliary shaft to drive the load rotation part to thus form a second power train; and
two one-way transmission units respectively provided between the load rotation part and the first transmission, and between the load rotation part and the second transmission, so to transmit revolving power from the motor main shaft or the auxiliary shaft to the load rotation part, and which prevent the motor main shaft or the auxiliary shaft from receiving an inverse transmission force from a direction of the load rotation part.

2. A driven system, comprising:
a motor unit, including
 a hollow motor main shaft,
 an auxiliary shaft co-axially inserted within the hollow motor main shaft, the auxiliary shaft being adapted to be driven manually,
 a motor rotor connected to the hollow motor main shaft,
 a motor stator disposed inside of the motor rotor, the motor rotor being adapted to rotate freely around the motor stator, the auxiliary shaft being adapted to revolve freely within the motor main shaft, and
 a plurality of bearings disposed to support respective ends of the motor main shaft and the auxiliary shaft;
a load rotation part revolvingly supported by a bearing;
first and second transmissions having different speed ratios and being respectively provided between the load rotation part and the motor main shaft, and the load rotation part and the auxiliary shaft, to jointly drive the load rotation part, the first transmission being connected to the motor main shaft to drive the load rotation part to thus form a first power train, while the second transmission being connected to the auxiliary shaft to drive the load rotation part to thus form a second power train; and
two one-way transmission units respectively provided between the load rotation part and the first transmission, and between the load rotation part and the second transmission, so to transmit revolving power from the motor main shaft or the auxiliary shaft to the load rotation part, and which prevent the motor main shaft or the auxiliary shaft from receiving an inverse transmission force from a direction of the load rotation part.

* * * * *